(12) United States Patent
Wang

(10) Patent No.: US 7,227,553 B2
(45) Date of Patent: Jun. 5, 2007

(54) METHOD OF DIGITAL CREATION OF A MULTIVISION FILTER EFFECT

(75) Inventor: Fu-Sheng Wang, Taipei (TW)

(73) Assignee: Ulead Systems, Inc, Taipei (TW)

( * ) Notice: Subject to any disclaimer, the term of this patent is extended or adjusted under 35 U.S.C. 154(b) by 196 days.

(21) Appl. No.: 10/790,132

(22) Filed: Mar. 2, 2004

(65) Prior Publication Data

US 2005/0195215 A1 Sep. 8, 2005

(51) Int. Cl.
*G09G 5/02* (2006.01)
(52) U.S. Cl. .................................. 345/589; 345/629
(58) Field of Classification Search ................ 345/589, 345/629, 625
See application file for complete search history.

(56) References Cited

U.S. PATENT DOCUMENTS 5,706,417 A * 1/1998 Adelson ..................... 345/640
6,028,583 A * 2/2000 Hamburg .................... 345/629
2003/0202697 A1* 10/2003 Simard et al. .............. 382/195

* cited by examiner

*Primary Examiner*—Mark Zimmerman
*Assistant Examiner*—David Chu
(74) *Attorney, Agent, or Firm*—Birch, Stewart, Kolasch & Birch, LLP

(57) ABSTRACT

A method of digital creation of a multivision filter effect. The method includes the steps of initializing a plurality of layers and masks corresponding to the layers, wherein the layers and masks have the same dimensions as a picture, and each of the layers has pixel information of the picture, translating the layers and masks to positions determined according to user input, determining pixel values of each of the masks according to the positions thereof, and merging the layers to which the corresponding masks are applied.

7 Claims, 11 Drawing Sheets
(10 of 11 Drawing Sheet(s) Filed in Color)

METHOD OF DIGITAL CREATION OF A MULTIVISION FILTER EFFECT

BACKGROUND OF THE INVENTION

1. Field of the Invention

The present invention relates to a method of image processing and particularly to a method of digital creation of a multivision filter effect.

2. Description of the Prior Art

Multivision filters produce various effects in photography, with multiple identical images of a subject appearing in one picture. Several types of multivision filter are available. Depending on the type used, the number of the identical images in one picture can vary from 3 to around 25. FIG. 1 shows a picture taken by a camera equipped with a multivision filter.

As image processing software applications become more and more powerful, the multivision filter effect can be digitally created.

However, the multivision filter effect created by the conventional software applications are rarely satisfying. The identical images of the subject are simply positioned in evenly divided areas of the picture. The separation between the images in two adjacent areas defeats the desired effect.

SUMMARY OF THE INVENTION

The object of the present invention is to provide a method of digital creation of a multivision filter effect, which yields a more satisfying result.

The present invention provides a method of digital creation of a multivision filter effect. The method includes the steps of initializing a plurality of layers and masks corresponding thereto, wherein the layers and masks have the same dimension as the picture, and each of the layers has pixel information of the picture, translating the layers and masks to positions determined according to user input, determining pixel values of each of the masks according to the positions thereof, and merging the layers to which the corresponding masks are applied.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The present invention will become more fully understood from the detailed description given hereinbelow and the accompanying drawings, which are given by way of illustration only and thus not intended to be limitative of the present invention.

DETAILED DESCRIPTION OF THE INVENTION

Figure 1:
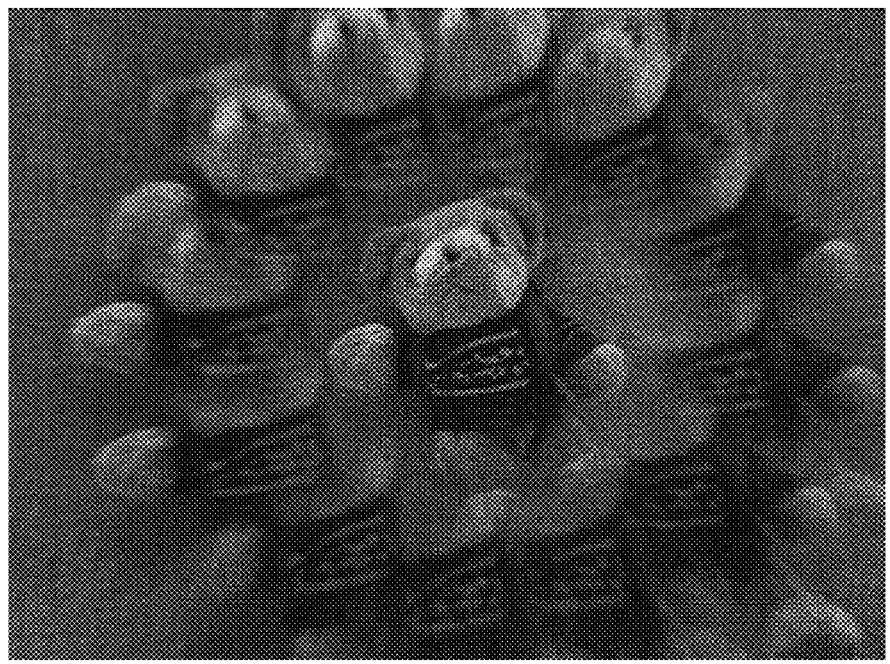
FIG. 1 shows a picture taken by a camera equipped with a multivision filter.
Figure 2:
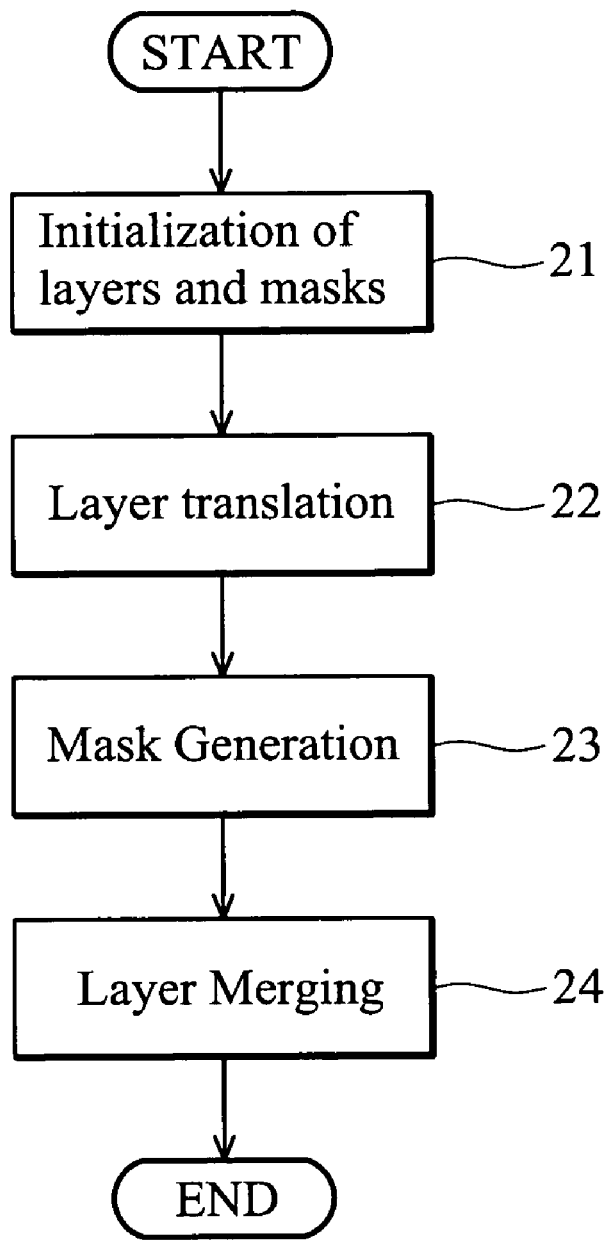
FIG. 2 is a flowchart of a method of digital creation of a multivision filter effect according to one embodiment of the invention.

FIG. 2 is a flowchart of a method for digital creation of a multivision filter effect according to one embodiment of the invention.

In step 21, layers and masks corresponding to the layers are initialized. The layers and masks have the same dimension as a picture. Each of the layers has pixel information of the picture while each of the masks has transparency information for pixels of each layer. The number of the layers and masks is determined according to user input. The user input includes information about a parameter T indicating the type of the multivision filter, a parameter d indicating a relative distance between each layer and a parameter θ indicating a rotation angle of the multivision filter.

In step 22, the layers and masks are translated to positions determined according to the user input. Both the numbers of the layers and masks are (N+1), and centers of the layers are evenly positioned in a circle and the center of the circle if the parameter T indicates a circular type of multivision filter, wherein the parameter θ is $2\pi/N$. On the other hand, if the parameter T indicates a linear type of multivision filter and the parameter d is D/N, the number of the layers is (N+1) while that of the masks is N, wherein centers of the layers are evenly positioned along a line of the length D from a start point of the line and the layer with its center on the start point has no corresponding mask.

In step 23, pixel values of each of the masks are determined according to the positions thereof. In a circular type, for each of the masks except that corresponding to the layer positioned on the center of the circle, the pixel values are determined so that the mask is a linear gradient mask obtained by two gradient direction vectors respectively from the center of its corresponding layer to the centers of two layers adjacent to its corresponding layer on the circle. As for the mask corresponding to the layer positioned in the center of the circle, the pixel values are determined so that the mask is a spherically gradient mask. In the linear type, for each of the masks, the pixel values are determined so that the mask is a linear gradient mask obtained by a gradient direction vector starting from (position n)−(n−1)*(d/2) and ending at (position n)−(n−1)*(d/2)−d, where n is the layer index, position n is located at a distance n×d away from the center of the $n^{th}$ layer and d=D/N.

In step 24, the layers to which the corresponding masks are applied are merged.

Figure 3:
FIG. 3–19 show examples of the pictures produced by a method of digital creation of a multivision filter effect according to one embodiment of the invention.

FIG. 3–15 show examples of the pictures produced by the previously described method. According to user input, the parameter T indicating the circular type of the multivision filter and the parameter θ indicating a rotation angle $2\pi/4$ of the multivision filter. The number of layers and masks is 5. As shown in FIG. 3, the layers are evenly positioned at the 4 small dots on and at the center of the circle.

Figure 4:
Figure 5:
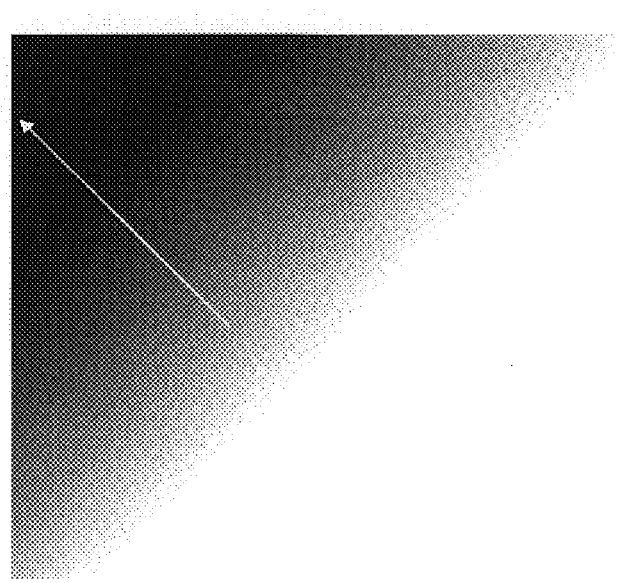

As shown in FIGS. 4 and 5, A linearly gradient mask is created using the gradient direction vector from the center of the first layer to its adjacent layer (the fourth layer). The length of the vector may be scaled by user input.

Figure 6:
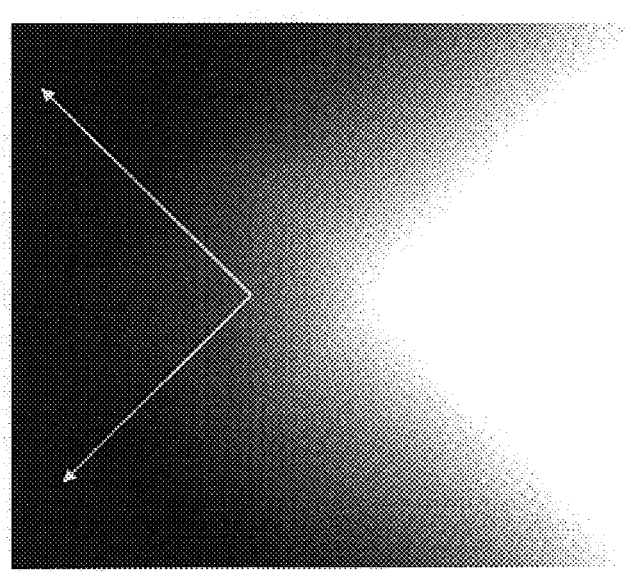

As shown in FIG. 6, another linear gradient direction vector from the first layer to another adjacent layer, the $2^{nd}$ layer, is applied to the previous mask. The length of the vector may also be scaled by the user input.

Figure 7:
Figure 8:
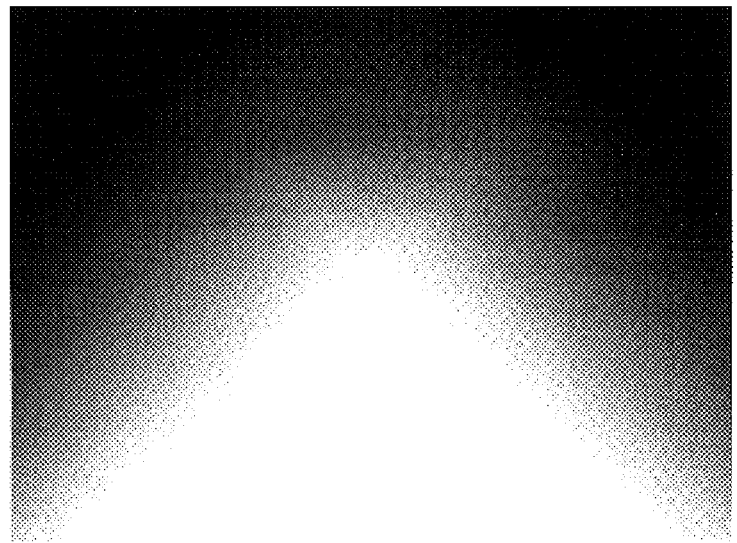
Figure 9:
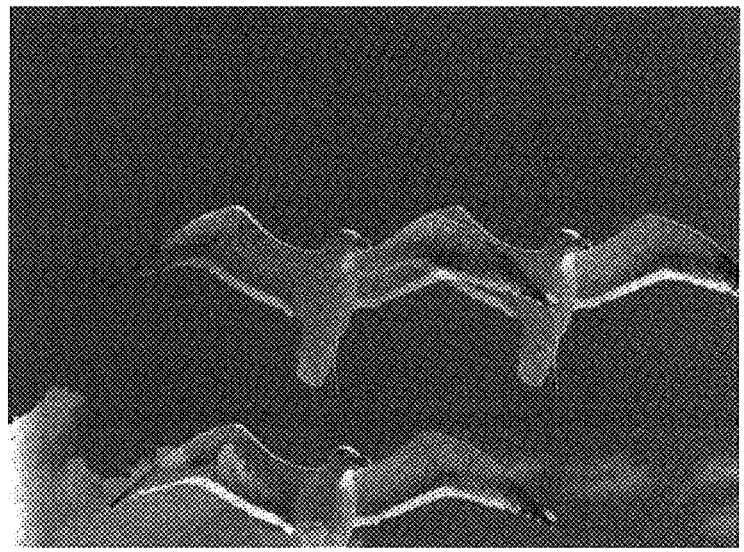
Figure 10:
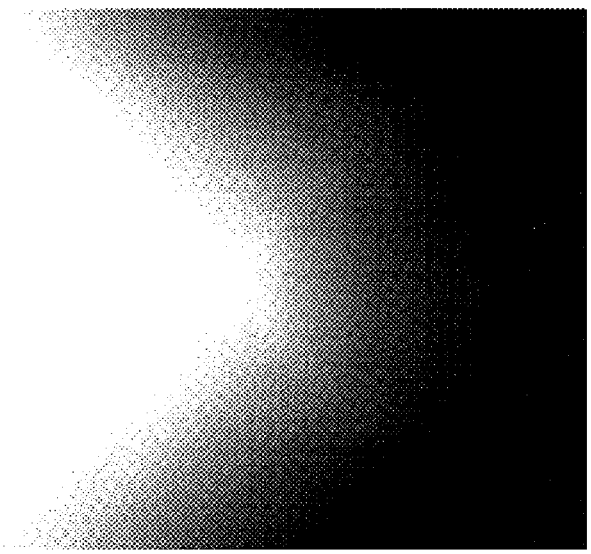
Figure 11:
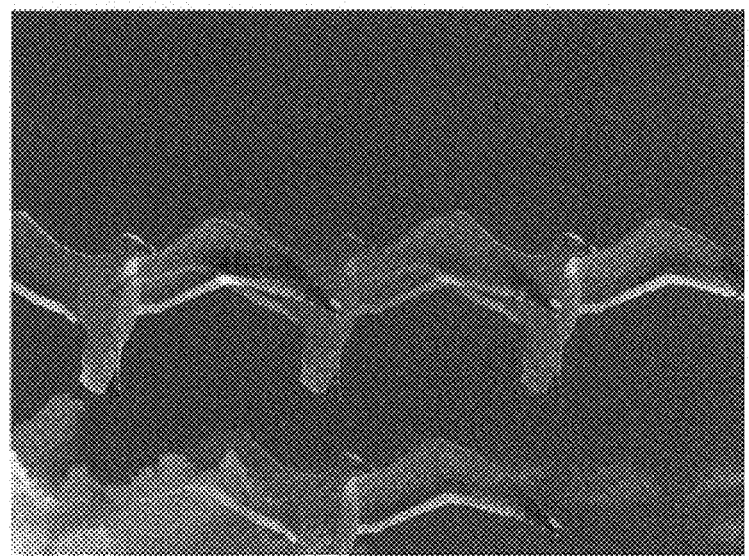
Figure 12:
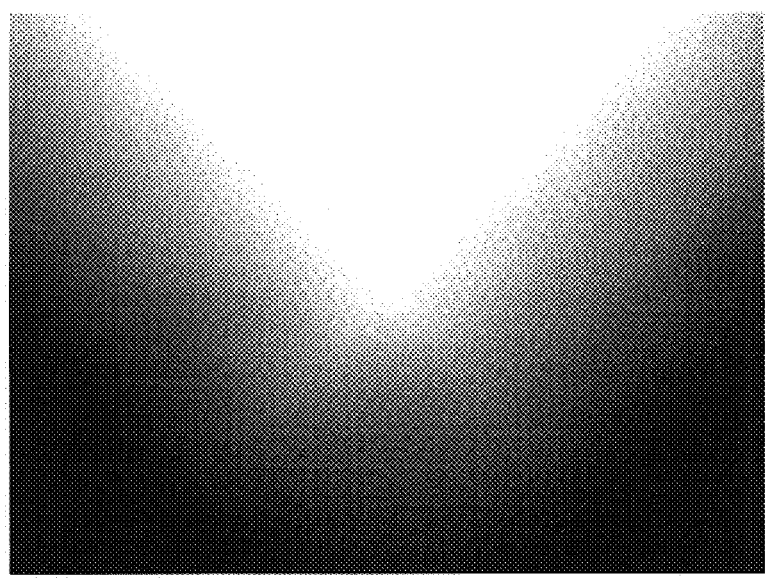
Figure 13:
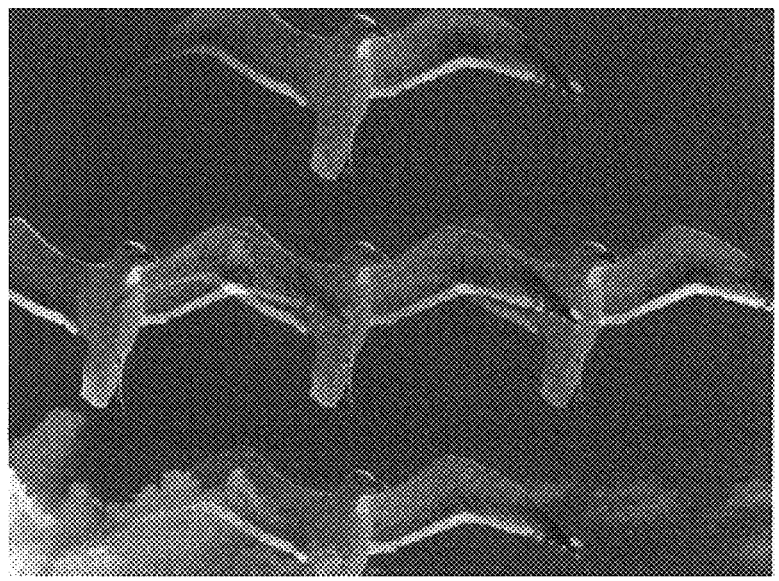

As shown in FIG. 7, the first layer to which a corresponding mask is applied is merged with the layer positioned at the center of the circle.

As shown in FIG. 8~13, the second, third and fourth layer and masks are created and merged with the same procedure as the first layer.

Figure 14:
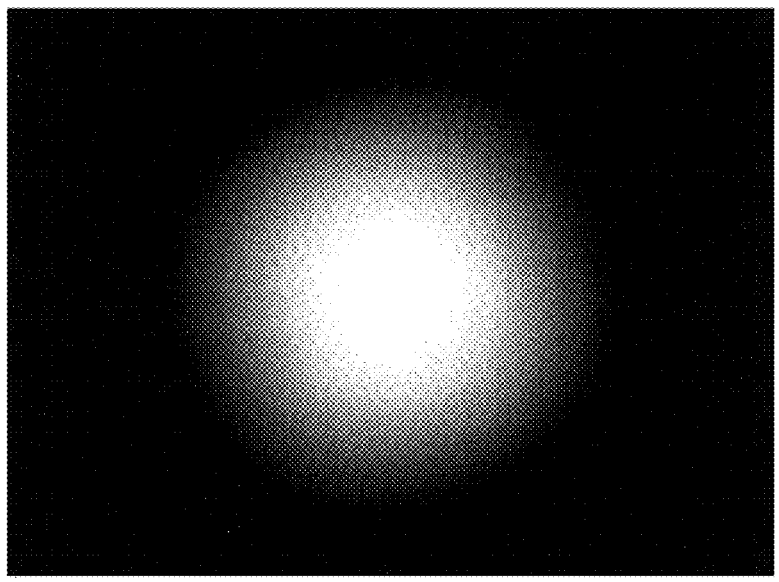
Figure 15:
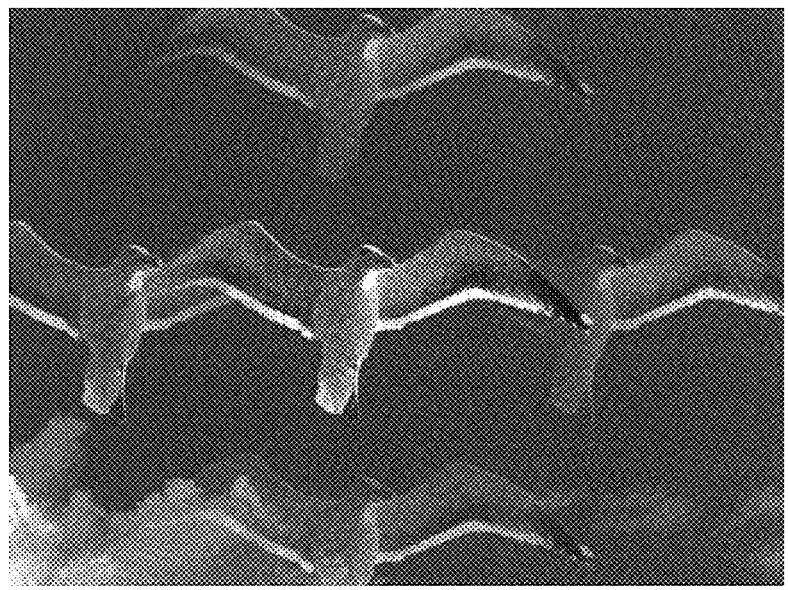

As shown in FIG. 14, a spherically gradient mask is created for the last layer. The radius of the sphere may also be adjusted according to the user input. Finally, all the layers to which the masks are applied are merged, as shown in FIG. 15.

Figure 16:
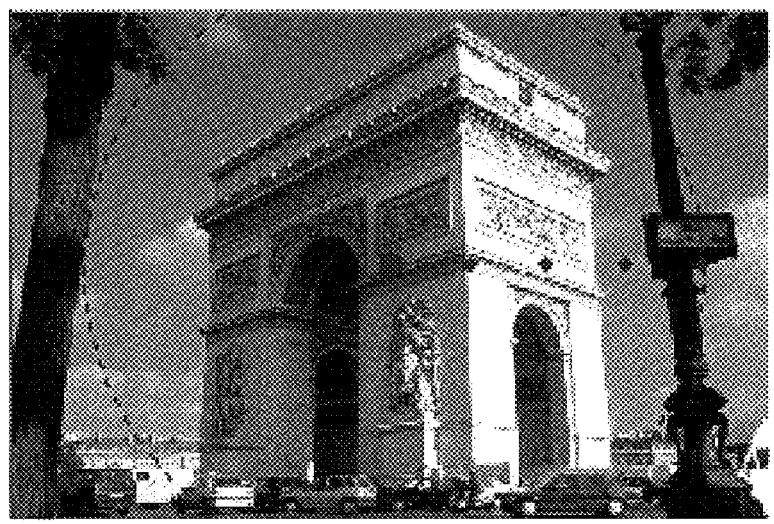

FIG. 16~19 show other examples of the pictures produced by the previously described method. According to user input, the parameter T indicating the linear type of the multivision filter and the parameter d indicating a distance D/4. The number of layers is 5 while that of the masks is 4. The centers of the layers are evenly positioned along a line of the length D from a start point of the line, as shown in FIG. 16.

Figure 17:
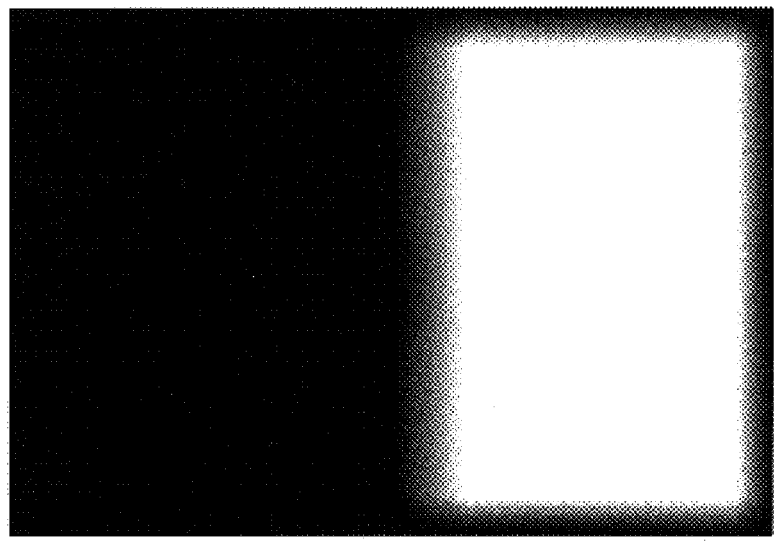
Figure 18:

As shown in FIG. 17, the pixel values of the mask for the first layer are calculated. According to step 23, the gradient direction vector g is a vector starting from (position 1) and ending at (position 1)−D/4. Then, the mask is applied to the first layer and the first layer is merged with the layer positioned at the start point of the line, as shown in FIG. 18.

Figure 19:

The second, third and fourth layer and masks are created and merged using the same procedure as the first layer. Finally, all the layers to which the masks are applied are merged, as shown in FIG. 19.

In conclusion, the present invention provides a method of digital creation of a multivision filter effect. Identical images of the subject are merged by layers to which linear gradient masks are applied. This eliminates the separation in the picture associated with the conventional method.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method of digital creation of a multivision filter effect, comprising the steps of:

initializing a plurality of layers and masks corresponding to the layers, wherein the layers and masks have the same dimensions as a picture, and each of the layers has the pixel information of the picture;

translating the layers and masks to positions determined according to user input, the user input comprising a parameter T indicating a type of multivision filter, a parameter d indicating a relative distance between each layer and a parameter θ indicating a rotation angle of the multivision filter;

determining pixel values of each of the masks according to the positions thereof; and merging the layers to which the corresponding masks are applied.

2. The method as claimed in claim 1, wherein each of the masks has transparency information for pixels of each layer.

3. The method as claimed in claim 1, wherein the number of layers and masks is determined according to user input.

4. The method as claimed in claim 1, wherein when the parameter T indicates a circular type of multivision filter and the parameter θ is 2π/N, both the number of the layers and masks are (N+1), and the centers of the layers are evenly positioned on a circle and the center of the circle.

5. The method as claimed in claim 4, wherein, for each of the masks except that corresponding to the layer positioned in the center of the circle, the pixel values are determined so that the mask is a linear gradient mask obtained by two gradient direction vectors respectively from the center of its corresponding layer to the centers of two layers adjacent to its corresponding layer on the circle.

6. The method as claimed in claim 5, wherein, for the mask corresponding to the layer positioned in the center of the circle, the pixel values are determined so that the mask is a spherically gradient mask.

7. The method as claimed in claim 1, wherein when the parameter T indicates a linear type of multivision filter and the parameter d is D/N, the number of the layers is (N+1) while that of the masks is N, and centers of the layers are evenly positioned along a line of the length D from a start point of the line.

\* \* \* \* \*